United States Patent
Wang et al.

(10) Patent No.: US 9,939,688 B2
(45) Date of Patent: Apr. 10, 2018

(54) LIQUID CRYSTAL DISPLAY PANEL HAVING PHOTO SPACERS EXTENDING INTO OPENINGS DEFINED BY COMMON ELECTRODE LAYER

(71) Applicant: WUHAN CHINA STAR OPTOELECTRONICS TECHNOLOGY CO. LTD., Hubei (CN)

(72) Inventors: Cong Wang, Hubei (CN); Peng Du, Hubei (CN)

(73) Assignee: WUHAN CHINA STAR OPTOELECTRONICS TECHNOLOGY CO. LTD., Hubei (CN)

( * ) Notice: Subject to any disclaimer, the term of this patent is extended or adjusted under 35 U.S.C. 154(b) by 130 days.

(21) Appl. No.: 14/905,973

(22) PCT Filed: Dec. 28, 2015

(86) PCT No.: PCT/CN2015/099232
§ 371 (c)(1),
(2) Date: Jan. 19, 2016

(87) PCT Pub. No.: WO2017/092115
PCT Pub. Date: Jun. 8, 2017

(65) Prior Publication Data
US 2017/0153481 A1 Jun. 1, 2017

(30) Foreign Application Priority Data

Dec. 1, 2015 (CN) .......................... 2015 1 0870387

(51) Int. Cl.
*G02F 1/1337* (2006.01)
*G02F 1/1343* (2006.01)
*G02F 1/1339* (2006.01)

(52) U.S. Cl.
CPC .................. *G02F 1/13394* (2013.01); *G02F 2001/133742* (2013.01); *G02F 2001/134318* (2013.01)

(58) Field of Classification Search
CPC .......... G02F 1/13394; G02F 1/133512; G02F 1/133707; G02F 1/134336; G02F 1/1339;
(Continued)

(56) References Cited

U.S. PATENT DOCUMENTS

2007/0085079 A1* 4/2007 Lee .................. G02F 1/133707
257/59
2008/0111964 A1 5/2008 Shirasaka et al.
(Continued)

FOREIGN PATENT DOCUMENTS

| CN | 101299121 A | 11/2008 |
| CN | 103353693 A | 10/2013 |
| CN | 103926747 A1 | 7/2014 |

*Primary Examiner* — Huyen Ngo
(74) *Attorney, Agent, or Firm* — Mark M. Friedman

(57) ABSTRACT

A liquid crystal display panel is provided, including: an array substrate; a color filter substrate opposite the array substrate, and a common electrode layer disposed on a side surface of the color filter substrate facing the array substrate of the color filter substrate; and a plurality of photo spacers disposed between the array substrate and the color filter substrate. The common electrode layer of the color filter substrate has a plurality of openings, and one end of each of the photo spacers is located on a corresponding opening.

11 Claims, 5 Drawing Sheets

(58) Field of Classification Search
CPC ......... G02F 1/133514; G02F 1/136227; G02F 2001/13396; G02F 2001/134318; G02F 1/133753; G02F 2001/133757; H01L 29/4908
See application file for complete search history.

(56) References Cited

U.S. PATENT DOCUMENTS

| | | | |
|---|---|---|---|
| 2010/0165278 A1* | 7/2010 | Matsumori | G02F 1/13394 349/123 |
| 2011/0096279 A1 | 4/2011 | Lee | |
| 2014/0198284 A1 | 7/2014 | Weng et al. | |
| 2014/0340603 A1* | 11/2014 | Hu | G02F 1/136227 349/43 |
| 2015/0198835 A1* | 7/2015 | Kwon | G02F 1/13394 349/139 |
| 2016/0195741 A1* | 7/2016 | Shiau | G02F 1/1337 349/106 |

* cited by examiner

LIQUID CRYSTAL DISPLAY PANEL HAVING PHOTO SPACERS EXTENDING INTO OPENINGS DEFINED BY COMMON ELECTRODE LAYER

FIELD OF THE INVENTION

The present invention relates to a field of display panels, and more particularly to a liquid crystal display panel.

BACKGROUND OF THE INVENTION

Please refer to FIG. 1 and FIG. 2, FIG. 1 depicts a diagram showing a top view of an array substrate 110 and a color filter substrate 120 in a conventional vertical alignment liquid crystal display panel 100, and FIG. 2 depicts a cross-sectional view diagram of the vertical alignment liquid crystal display panel 100 of FIG. 1, where the cross-sectional view diagram of FIG. 2 corresponds to a location taken along cutting line I-I of FIG. 1. The vertical alignment liquid crystal display panel 100 comprises the array substrate 110, the color filter substrate 120, and a liquid crystal layer 130 disposed between the array substrate 110 and the color filter substrate 120. For ease of understanding, in FIG. 1, the array substrate 110 and the color filter substrate 120 are respectively arranged on a left and a right side, however, the array substrate 110 actually is superposed on and corresponds to the color filter substrate 120 (as shown on FIG. 2).

As shown on FIG. 1, the array substrate 110 comprises a plurality of pixel units P, each of the pixel units P comprises a thin film transistor T, where the thin film transistor T is located on a middle location of the corresponding pixel unit P. As shown on FIG. 2, the array substrate 110 at least comprises a first substrate 111, the thin film transistor T, a planarization layer 112, and a pixel electrode layer 113, where a gate G, a drain D, and a source S of the thin film transistor T are sequentially formed on the first substrate 111, and then the planarization layer 112 and the pixel electrode layer 113 are sequentially formed. The planarization layer 112 has a through hole 114 which is near the thin film transistor T for exposing the source S of the thin film transistor T. In addition, the color filter substrate 120 comprises a second substrate 121, a black matrix layer 122, a color photoresist layer 123, and a common electrode layer 124 which are sequentially formed, where the common electrode layer 124 comprises an opening 125 which corresponds the thin film transistor T of the array substrate 110. When the vertical alignment liquid crystal display panel 100 is powered on, an electric field formed by the pixel electrode layer 113 of the array substrate 110 and the common electrode layer 124 of the color filter substrate 120 is directed to a center of the opening 125, so that liquid crystal molecules of the liquid crystal layer 130 are regularly tilted, so as to improve the problem caused by large viewing angle color shift. However, due to the electric field at the opening 125 of the common electrode layer 124 being non-uniform, the tilted directions of the liquid crystal molecules at this position are irregular (as shown on a dotted line region A of FIG. 2), and thereby causing the brightness on a display image to be non-uniform. To overcome the problem, hence, in the convectional vertical alignment liquid crystal display panel 100, by disposing the black matrix layer 122 on the opening 125 for shielding the opening 125, the quality of the display image is thereby improved. However, in order to ensure that the opening 125 can be successfully shielded by the black matrix layer 122, a width of the black matrix layer 122 located above the corresponding opening 125 must be greater than a diameter of the opening 125 (when the opening 125 is circular), whereby an aperture ratio of the vertical alignment liquid crystal display panel 100 is thus lost.

On the other hand, there are a plurality of photo spacers 140 located between the array substrate 110 and the color filter substrate 120 for supporting the array substrate 110 and the color filter substrate 120 to be spaced from each other by a specific distance. The plurality of photo spacers 140 are generally disposed on a location which is near the thin film transistor T, so that when in a liquid crystal cell assembling process, the photo spacer 140 near the through hole 114 of the planarization layer 112 may be easy to slide into the through hole 114, thereby causing that the array substrate 110 and the color filter substrate 120 cannot be successfully spaced from each other by the specific distance, and the display image will be abnormal.

Therefore, it is necessary to provide a liquid crystal display panel to solve the above-mentioned technical problems.

SUMMARY OF THE INVENTION

In order to solve the above-mentioned technical problems, an objective of the present invention is to provide a liquid crystal display panel, where one end of each of photo spacers us located on an opening of the common electrode layer of the color filter substrate, so as to prevent that the tilted directions of the liquid crystal molecules are irregular at the location of the corresponding opening. Thus, the presence of the black matrix layer at the location of the opening is omitted, thereby increasing an aperture ratio of the liquid crystal display panel.

On the other hand, by setting a thin film transistor of each pixel unit of the liquid crystal display panel and the opening of the common electrode layer to be spaced from each other by a longitudinal distance, the problem caused by the photo spacer sliding into a through hole of a planarization layer of an array substrate is prevented during a liquid crystal cell assembling process.

In order to achieve the above objects, the present invention provides a liquid crystal display panel, comprising: an array substrate, comprising a plurality of pixel units, each of the pixel units including a thin film transistor; a color filter substrate opposite the array substrate, and a common electrode layer disposed on a side surface of the color filter substrate facing the array substrate; and a plurality of photo spacers disposed between the array substrate and the color filter substrate, wherein the common electrode layer of the color filter substrate has a plurality of openings, and one end of each of the photo spacers is located on a corresponding opening, and one of the openings on the common electrode layer of the color filter substrate is located between two longitudinally adjacent thin film transistors, the two longitudinally adjacent thin film transistors are connected to a same data line; and wherein the color filter substrate includes a black matrix layer which corresponds to the thin film transistors of the array substrate.

In order to achieve the above objects, the present invention also provides a liquid crystal display panel, comprising: an array substrate; a color filter substrate opposite the array substrate, and a common electrode layer disposed on a side surface of the color filter substrate facing the array substrate; and a plurality of photo spacers disposed between the array substrate and the color filter substrate, wherein the common electrode layer of the color filter substrate has a plurality of openings, and one end of each of the photo spacers is located on a corresponding opening.

In one preferred embodiment of the present invention, the array substrate comprises a plurality of pixel units, each of the pixel units includes a thin film transistor, and one of the openings on the common electrode layer of the color filter substrate is located between two longitudinally adjacent thin film transistors.

In one preferred embodiment of the present invention, the two longitudinally adjacent thin film transistors are connected to a same data line.

In one preferred embodiment of the present invention, the color filter substrate includes a black matrix layer which corresponds to the thin film transistors of the array substrate.

In one preferred embodiment of the present invention, in a range of one of the pixel units, the thin film transistor is located on a corner region of the one of the pixel units.

In one preferred embodiment of the present invention, the array substrate comprises a planarization layer disposed on the thin film transistor, and the planarization layer comprises a through hole for exposing a source of the thin film transistor.

In one preferred embodiment of the present invention, in a range of one of the pixel units, the through hole of the planarization layer of the array substrate and the opening of the common electrode layer of the color filter substrate are spaced from each other by a longitudinal distance, and the longitudinal distance is greater than a sum of a width of the through hole and a diameter of the opening.

In one preferred embodiment of the present invention, a pixel electrode layer is disposed on a side surface of the array substrate facing the color filter substrate, and another end of each of the photo spacers is rested on the pixel electrode layer.

In one preferred embodiment of the present invention, the color filter substrate comprises a black matrix layer, a color photoresist layer, and the common electrode layer, wherein only the color photoresist layer on the color filter substrate is presented at positions of the plurality of openings of the common electrode layer.

The present invention also provides a liquid crystal display panel, comprising: an array substrate, comprising a plurality of pixel units, each of the pixel units including a thin film transistor which is located on a corner region of the pixel unit; a color filter substrate opposite the array substrate, and a common electrode layer disposed on a side surface of the color filter substrate facing the array substrate; and a plurality of photo spacers disposed between the array substrate and the color filter substrate, wherein the common electrode layer of the color filter substrate has a plurality of openings, and one end of each of the photo spacers is located on a corresponding opening, and each of the openings is located on a middle location of a corresponding pixel unit.

BRIEF DESCRIPTION OF THE DRAWINGS

In order to make the present invention more clear, preferred embodiments and the drawings thereof are described in detail below.

DETAILED DESCRIPTION OF THE INVENTION

Figure 1:
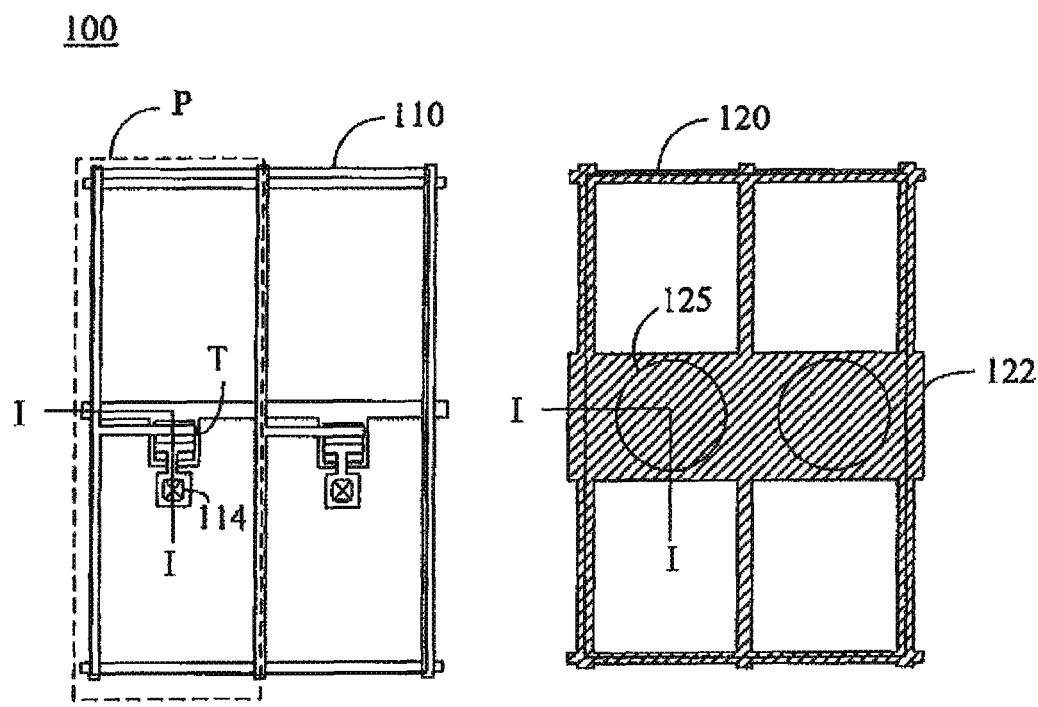
FIG. 1 depicts a diagram showing a top view of an array substrate and a color filter substrate in a conventional vertical alignment liquid crystal display panel.
Figure 2:
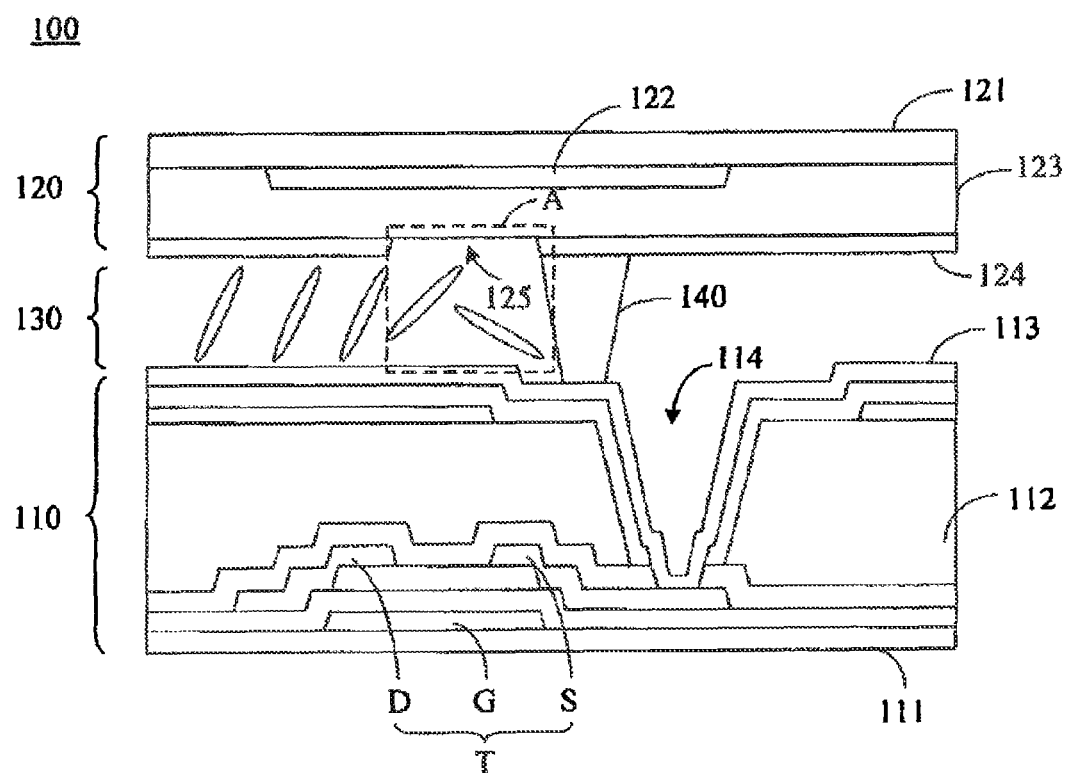
FIG. 2 depicts a cross-sectional view diagram of the vertical alignment liquid crystal display panel of FIG. 1.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

In the drawings, the same reference symbol represents the same or similar components.

Figure 3:
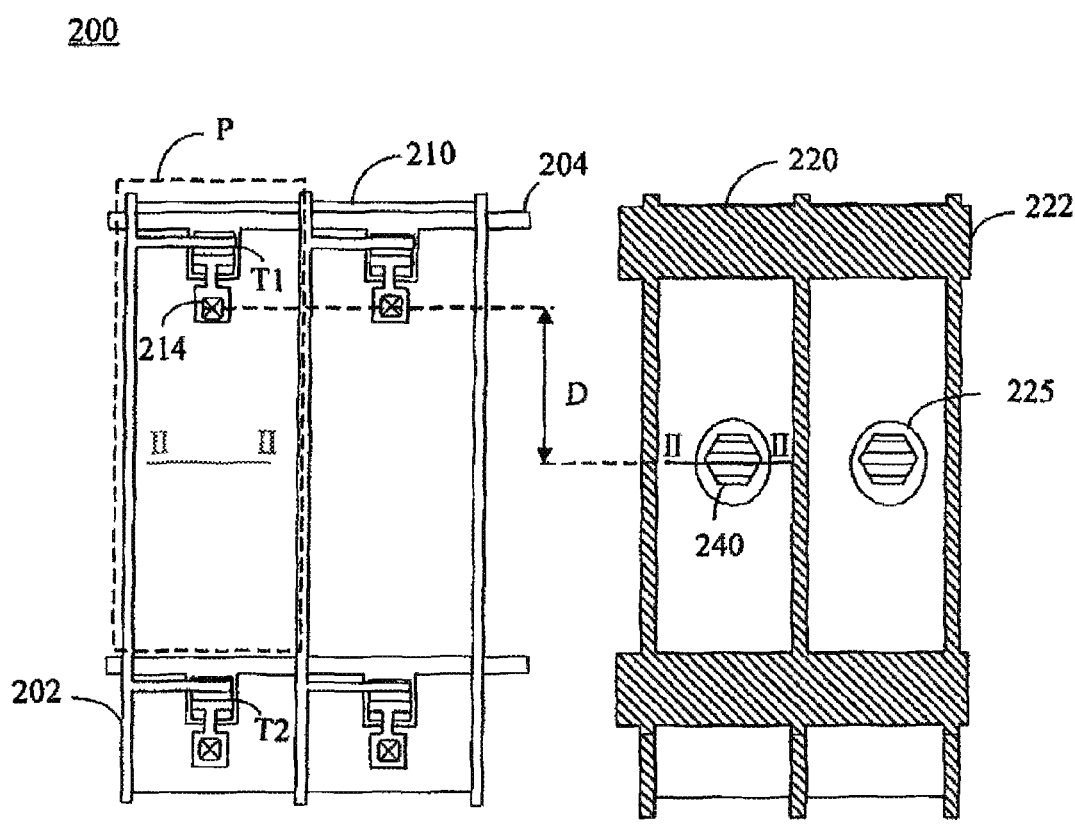
FIG. 3 depicts a diagram showing a top view of an array substrate and a color filter substrate in a liquid crystal display panel according to a preferred embodiment of the present invention.
Figure 4:
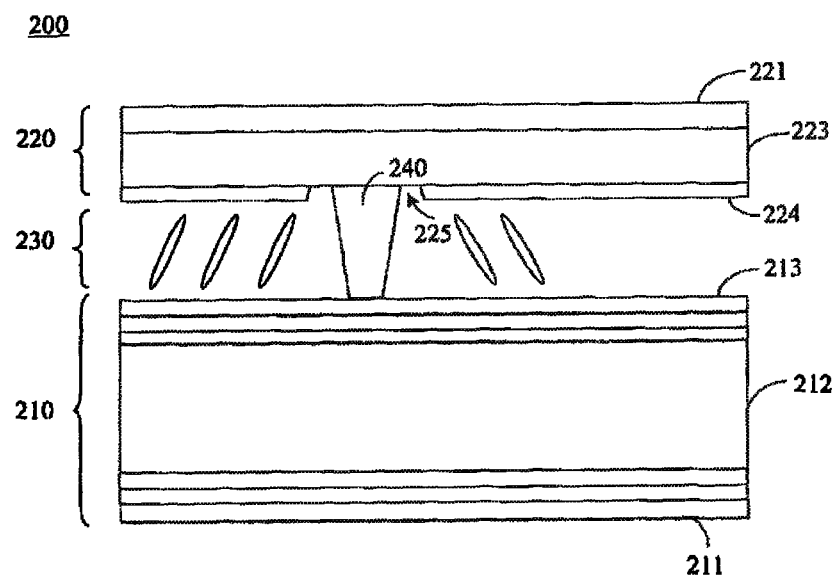
FIG. 4 depicts a cross-sectional view diagram of the liquid crystal display panel of FIG. 3.

Please refer to FIG. 3 and FIG. 4, FIG. 3 depicts a diagram showing a top view of an array substrate 210 and a color filter substrate 220 in a liquid crystal display panel 200 according to a preferred embodiment of the present invention, and FIG. 4 depicts a cross-sectional view diagram of the liquid crystal display panel 200 of FIG. 3, where the cross-sectional view diagram of FIG. 4 corresponds to a location taken along cutting line II-II of FIG. 3. The liquid crystal display panel 200 comprises an array substrate 210, a color filter substrate 220, and a liquid crystal layer 230 and a plurality of photo spacers 240, which are disposed between the array substrate 210 and the color filter substrate 220. For ease of understanding, in FIG. 3, the array substrate 210 and the color filter substrate 220 are respectively arranged on a left and a right side, however, the array substrate 210 actually is superposed on and corresponds with the color filter substrate 220 (as shown on FIG. 4).

As shown on FIG. 3, the array substrate 210 comprises a plurality of data lines 202 which are parallel to each other along a traverse direction, a plurality of scan line 204 which are parallel to each other along a longitudinal direction, and a plurality of pixel units P which are defined by the plurality of data lines 202 and the plurality of scan line 204. Each of the pixel units P comprises a thin film transistor T1 (or T2), where each thin film transistor T1 (or T2) is disposed on a corner region corresponding to the pixel unit P. For example, in FIG. 3, the thin film transistor T1 is disposed on an upper left corner region of the corresponding pixel unit P. The color filter substrate 220 comprises a black matrix layer 222, and the black matrix layer 222 is correspondingly disposed at a location for shielding the plurality of data lines 202, the plurality of scan line 204, and the thin film transistor T1 (or T2).

As shown on FIG. 4, the array substrate 210 also comprises a first substrate 211, a planarization layer 212, and a pixel electrode layer 213, where the planarization layer 212 and the pixel electrode layer 213 are sequentially formed on the first substrate 211, and the electrode layer 213 is located on a side surface which faces the color filter substrate 220. The color filter substrate 220 also comprises a second substrate 221, a color photoresist layer 223, and a common electrode layer 224, where the color photoresist layer 223 and the common electrode layer 224 are sequentially formed on the second substrate 221, and the common electrode layer 224 is located on a side surface which faces the array substrate 210. The common electrode layer 124 of the color filter substrate 220 comprises a plurality of openings 225. Each of the openings 225 is generally located on a middle location of the corresponding pixel unit P. At positions of the plurality of openings 225 of the common electrode layer 224, only the color photoresist layer 223 is presented; that is, at the positions of the plurality of openings 225 on the color filter substrate 220, the black matrix layer 222 will not be presented. Furthermore, as shown on FIG. 4, one end of each of the photo spacers 240 is located on a corresponding opening 225, and another end of each of the photo spacers 240 is rested on the pixel electrode layer 213 of the array substrate 210, in order to support the array substrate 210 and the color filter substrate 220 to space from each other by a specific distance. When the liquid crystal display panel 200 is powered on, an electric field formed by the pixel electrode layer 213 of the array substrate 210 and the common electrode layer 224 of the color filter substrate 220 is directed to a center of the opening 225, so that liquid crystal molecules of the liquid crystal layer 230 are regularly tilted, so as to achieve multi-domain display, thereby improving the problem caused by large viewing angle color shift. It should be noted that on the color filter substrate 220 of the present invention, by disposing the one end of the photo spacer 240 on the opening 225, the problems, such as the tilted directions of the liquid crystal molecules being irregular and the brightness on a display image being non-uniform, caused by the electric field at the opening 225 being non-uniform are prevented. That is, at the openings 225 where the tilted directions of the liquid crystal molecules being irregular occur can be shielded by the photo spacers 240. Therefore, on the liquid crystal display panel 200 of the present invention, the problem caused by the tilted directions of the liquid crystal molecules being irregular at the opening 225 can be solved without using the black matrix layer 222 to shield the opening 225. Moreover, it is also unnecessary to provide the black matrix layer 222 having a relatively large area for matching the width of the opening 225, so that the shielding area of the black matrix layer 222 can be correspondingly decreased, thereby increasing the aperture ratio of the liquid crystal display panel 200 of the present invention.

Figure 5:
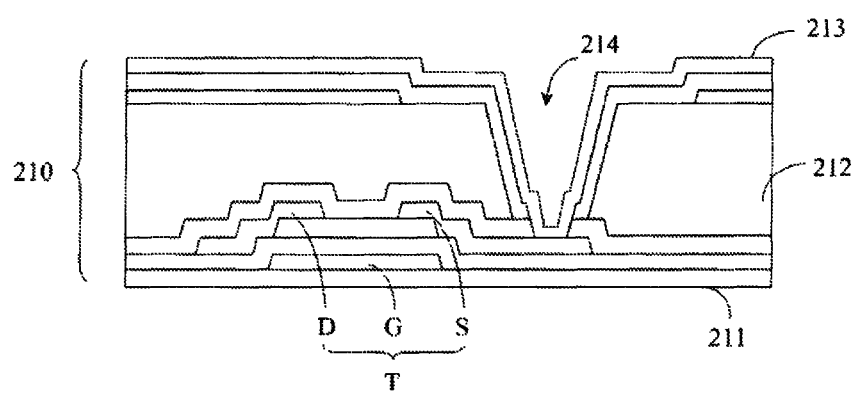
FIG. 5 depicts a cross-sectional view diagram of an array substrate of the liquid crystal display panel of FIG. 3.

Referring to FIG. 3 and FIG. 5, where FIG. 5 depicts a cross-sectional view diagram of an array substrate of the liquid crystal display panel of FIG. 3. The opening 225 on the common electrode layer 224 of the color filter substrate 220 is located between two longitudinally adjacent thin film transistors, e,g., the thin film transistor T1 and the thin film transistor T2 which are connected to same data line 202. Preferably, the opening 225 is disposed on a middle location of the two longitudinally adjacent thin film transistors. In addition, the planarization layer of the array substrate 210 comprises a plurality of through holes 214 for exposing a source S of the corresponding thin film transistor T1 (or T2). That is, in a range of one of the pixel units P, the through hole 214 of the planarization layer 212 of the array substrate 210 and the opening 225 of the common electrode layer 224 of the color filter substrate 220 are spaced from each other by a longitudinal distance D, and the longitudinal distance D is greater than a sum of a width of the through hole 214 and a diameter of the opening 225 (if the opening 225 is circular). Since the distance between the opening 225 is sufficiently far away from the through hole 214, the risk that the photo spacer 240 slides into the through hole 214 would not occur during a liquid crystal cell assembling process.

In summary, in the present invention, by disposing the one end of the photo spacer 240 on the opening 225 of the common electrode layer 224 of the color filter substrate 200, the problem caused by the tilted directions of the liquid crystal molecules being irregular on the corresponding opening 225 is prevented. Thus, it is unnecessary to provide the black matrix layer 222 having a relatively large area on the location of the opening 225, thereby increasing the aperture ratio of the liquid crystal display panel 200. On the other hand, in the present invention, by setting the thin film transistor T1 (or T2) on each pixel unit P of the liquid crystal display panel 200 and the opening 225 of the common electrode layer 224 to be spaced from each other by the longitudinal distance D, the risk that the photo spacer 240 slides into the through hole 214 of the planarization layer 212 of the array substrate 210 would not occur during a liquid crystal cell assembling process.

The above descriptions are merely preferable embodiments of the present invention, and are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A liquid crystal display panel, comprising:
    an array substrate, comprising a plurality of pixel units, each of pixel units, including a thin film transistor;
    a color filter substrate opposite the array substrate, and a common electrode layer disposed on a side surface of the color filter substrate facing the array substrate; and
    a plurality of photo spacers disposed between the array substrate and the color filter substrate, wherein the common electrode layer of the color filter substrate has a plurality of openings, and one end of each of the photo spacers is located on a corresponding opening, and one of the openings on the common electrode layer of the color filter substrate is located between two longitudinally adjacent thin film transistors, the two longitudinally adjacent thin film transistors are connected to a same data line; and wherein the color filter substrate includes a black matrix layer which corresponds to the thin film transistors of the array substrate,
    wherein the array substrate comprises a planarization layer disposed on the thin film transistor, and the planarization layer comprises a through hole for exposing a source of the thin film transistor; and
    wherein in a range of one of the pixel units, the through hole of the planarization layer of the array substrate and the opening of the common electrode layer of the color filter substrate are spaced from each other by a longitudinal distance measured from a center of the through hole to a center of the opening, and a direction of the longitudinal distance is parallel to an extending direction of the data line, and the longitudinal distance is greater than a sum of a width of the through hole and a diameter of the opening.

2. The liquid crystal display panel as claimed in claim 1, wherein in a range of one of the pixel units, the thin film transistor is located on a side region of the one of the pixel units.

3. The liquid crystal display panel as claimed in clam 1, wherein a pixel electrode layer is disposed on a side surface of the array substrate facing the color filter substrate, and another end of each of the photo spacers is rested on the pixel electrode layer.

4. A liquid crystal display panel, comprising:
an array substrate;
a color filter substrate opposite the array substrate, and a common electrode layer disposed on a side surface of the color filter substrate facing the array substrate; and
a plurality of photo spacers disposed between the array substrate and the color filter substrate, wherein the common electrode layer of the color filter substrate has a plurality of openings, and one end of each of the photo spacers is located on a corresponding opening,
wherein the array substrate comprises a planarization layer disposed on thin film transistor, and the planarization layer comprises a through hole for exposing a source of the thin film transistor; and
wherein in a range of one of the pixel units, the through hole of the planarization layer of the array substrate and the opening of the common electrode layer of the color filter substrate are spaced from each other by a longitudinal distance measured from a center of the through hole to a center of the opening, and a direction of the longitudinal distance is parallel to an extending direction of a data line, and the longitudinal distance is greater than a sum of a width of the through hole and a diameter of the opening.

5. The liquid crystal display panel as claimed in claim 4, wherein the array substrate comprises a plurality of pixel units, each of the pixel units includes the thin film transistor, and one of the openings on the common electrode layer of the color filter substrate is located between two longitudinally adjacent thin film transistors.

6. The liquid crystal display panel as claimed in claim 5, wherein the two longitudinally adjacent thin film transistors are connected to a same data line.

7. The liquid crystal display panel as claimed in claim 5, wherein the color filter substrate includes a black matrix layer which corresponds to the thin film transistors of the array substrate.

8. The liquid crystal display panel as claimed in claim 5, wherein in a range of one of the pixel units, the thin film transistor is located on a side region of the one of the pixel units.

9. The liquid crystal display panel as claimed in claim 4, wherein a pixel electrode layer is disposed on a side surface of the array substrate facing the color filter substrate, and another end of each of the photo spacers is rested on the pixel electrode layer.

10. The liquid crystal display panel as claimed in claim 4, wherein the color filter substrate comprises a black matrix layer, a color photoresist layer, and the common electrode layer, wherein only the color photoresist layer on the color filter substrate is presented at positions of the plurality of openings of the common electrode layer.

11. A liquid crystal display panel, comprising:
an array substrate, comprising a plurality of pixel units, each of the pixel units including a thin film transistor which is located on a side region of the pixel unit;
a color filter substrate opposite the array substrate, and a common electrode layer disposed on a side surface of the color filter substrate facing the array substrate; and
a plurality of photo spacers disposed between the array substrate and the color filter substrate, wherein the common electrode layer of the color filter substrate has a plurality of openings, and one end of each of the photo spacers is located on a corresponding opening, and each of the openings is located on a middle location of a corresponding pixel unit,
wherein the arrays substrate comprises a planarization layer disposed on the thin film transistor, and the planarization layer comprises a through hole for exposing a source of the thin film transistor; and
wherein in a range of one of the pixel units, the through hole of the planarization layer of the array substrate and the opening of the common electrode layer of the color filter substrate are spaced from each other by a longitudinal distance measured from a center of the through hole to a center of the opening, and a direction of the longitudinal distance is parallel to an extending direction of the data line, and the longitudinal distance is greater than a sum of a width of the through hole and a diameter of the opening.

* * * * *